US005448384A

United States Patent [19]

Uchino et al.

[11] Patent Number: 5,448,384

[45] Date of Patent: Sep. 5, 1995

[54] ACTIVE MATRIX LIQUID CRYSTAL DISPLAY DEVICE HAVING DISCHARGE ELEMENTS CONNECTED BETWEEN INPUT TERMINALS AND COMMON TERMINAL

[75] Inventors: Katsuhide Uchino; Toshikazu Maekawa; Hiroaki Ichikawa, all of Kanagawa, Japan

[73] Assignee: Sony Corporation, Tokyo, Japan

[21] Appl. No.: 172,272

[22] Filed: Dec. 23, 1993

[30] Foreign Application Priority Data

Dec. 25, 1992 [JP] Japan .................................. 4-359186

[51] Int. Cl.$^6$ ......................... G02F 1/133; G09G 3/36

[52] U.S. Cl. ........................................ 359/59; 359/85; 359/87; 359/57; 345/92

[58] Field of Search ........................ 359/54, 87, 55, 57, 359/85, 84; 345/92, 94, 96; 348/761, 766, 790, 791

[56] References Cited

U.S. PATENT DOCUMENTS

| | | | |
|---|---|---|---|
| 4,062,626 | 12/1977 | Kawakami et al. | 359/57 |
| 4,319,237 | 3/1982 | Matsuo et al. | 345/92 |
| 4,803,480 | 2/1989 | Soneda et al. | 345/92 |
| 4,818,077 | 4/1989 | Ohwada et al. | 359/56 |
| 4,823,126 | 4/1989 | Nagata et al. | 345/92 |
| 4,922,240 | 5/1990 | Duwaer | 345/92 |
| 5,194,974 | 3/1993 | Hamada et al. | 359/54 |

FOREIGN PATENT DOCUMENTS

| | | |
|---|---|---|
| 0424958A2 | 5/1991 | European Pat. Off. . |
| 0448105A2 | 9/1991 | European Pat. Off. . |
| 3137245 | 4/1983 | Germany . |
| 02081585 | 6/1990 | Japan . |

*Primary Examiner*—William L. Sikes
*Assistant Examiner*—Tai V. Duong
*Attorney, Agent, or Firm*—Hill, Steadman & Simpson

[57] ABSTRACT

A liquid crystal display device of the active matrix type which prevents residual of charge in liquid crystal picture elements with respect to time. The active matrix liquid crystal display device includes liquid crystal picture elements formed from a liquid crystal layer held between picture element electrodes arranged in a matrix and common electrodes opposing to the picture element electrodes, and picture element transistors corresponding to the liquid crystal picture elements. While a predetermined reference potential is supplied to the common electrode, image signals are applied to the individual picture element electrodes by way of signal lines and picture element transistors to effect ac driving of the liquid crystal picture elements. Discharge means for connecting the common electrodes and the picture element electrodes to an equivalent potential to each other is provided to discharge the charge remaining in the liquid crystal picture elements thereby to prevent the variation of the reference potential.

7 Claims, 9 Drawing Sheets

ACTIVE MATRIX LIQUID CRYSTAL DISPLAY DEVICE HAVING DISCHARGE ELEMENTS CONNECTED BETWEEN INPUT TERMINALS AND COMMON TERMINAL

BACKGROUND OF THE INVENTION

1. Field of the Invention

This invention relates generally to an active matrix liquid crystal display device, and more particularly to a technique of preventing charge from remaining in liquid crystal picture elements.

2. Description of the Related Art

Conventional liquid crystal display devices of the active matrix type have such a general construction as shown in FIG. 6. Referring to FIG. 6, the liquid crystal display device shown includes a liquid crystal layer 103 held between a driving circuit board 101 and an opposing circuit board 102 which are disposed opposite to each other with a predetermined gap therebetween. Gate lines 104 and signal lines 105 are disposed in an intersecting relationship with each other in a matrix on a surface of the driving circuit board 101, and picture element electrodes 106 are formed at individual intersecting points between the gate lines 104 and the signal lines 105. Also picture element transistors 107 are formed corresponding to the individual picture element electrodes 106. The gate electrodes of the picture element transistors 107 are connected to corresponding ones of the gate lines 104, and the drain electrodes of the picture element transistors 107 are connected to corresponding ones of the picture element electrodes 106 while the source electrodes of the picture element transistors 107 are connected to corresponding ones of the signal lines 105. Meanwhile, common electrodes 108 and a color filter layer 109 are provided on an inner face of the opposing circuit board 102. Liquid crystal picture elements are defined in a matrix by the liquid crystal layer 103 held between the common electrodes 108 and the picture element electrodes 106 opposite to each other. The two circuit boards 101 and 102 are adhered to each other, and polarization plates 110 and 111 are adhered to outer surfaces of the circuit boards 101 and 102.

FIG. 7 is a circuit diagram of an equivalent circuit for a liquid crystal picture element in such a conventional liquid crystal display device as shown in FIG. 6. Referring to FIG. 7, the gate electrode of a picture element transistor Tr is connected to a gate line Y so that a gate pulse $V_G$ is applied to the gate electrode for a predetermined selection period. The source electrode of the picture element transistor Tr is connected to a signal line X so that an image signal Vsig, which reverses after each one field period or one horizontal scanning period with reference to a predetermined reference potential, is supplied to the source electrode. The drain electrode of the picture element transistor Tr is connected to a corresponding picture element electrode E. A liquid picture element PXL is defined by the liquid crystal layer held between the picture element electrode E and a common electrode COM opposite to the picture element electrode E. A predetermined reference potential Vcom is applied to the common electrode COM. It is to be noted that the liquid crystal picture element PXL is a capacitive load and normally has an auxiliary capacitance in addition to the capacitance of the liquid crystal.

FIG. 8 illustrates operation of the liquid crystal picture element shown in FIG. 7. Referring to FIG. 8, each time a gate pulse $V_G$ is applied, the picture element transistor Tr conducts so that an image signal Vsig is written into the liquid crystal picture element. After the gate pulse $V_G$ disappears, the image signal Vsig is held in the liquid crystal picture element. When another gate pulse $V_G$ is applied at next selection timing, another image signal Vsig reversed with respect to a predetermined center potential Vref is written into the liquid crystal picture element. In principle, in order to effect ac driving, the reference potential Vcom to be applied to the common electrode COM is set so as to coincide with the center potential Vref of the image signal Vsig. However, an actual liquid crystal picture element potential Vp must necessarily be optimized by adjusting the reference potential Vcom since actually it shifts downwardly from the level of the image signal Vsig. As seen from FIG. 8, when a gate pulse $V_G$ falls, a voltage drop is produced by capacitive coupling between the gate electrode and the drain electrode of the picture element transistor Tr, and consequently, the picture element potential Vp drops by $\Delta V_A$ on the positive polarity side and drops by $\Delta V_B$ on the negative polarity side. The reference potential Vcom optimized taking the voltage drops into consideration is given by $Vref-(\Delta V_A+\Delta V_B)$.

FIG. 9 illustrates the difference between the optimum values of the reference potential Vcom when an ordinary operation is performed and when a referring operation is performed. The data of the graph were obtained from a measurement conducted for a large number of samples in order to detect a dispersion of the reference potential Vcom. The optimum reference potential in an ordinary operation is represented by VcomN. The optimum reference potential VcomN is obtained by subtracting the voltage drop caused by capacitive coupling from the center potential Vref of the image signal Vsig as described above with reference to FIG. 8. Meanwhile, in a referring operation, the image signals Vsig are supplied while all of the picture element transistors are always in a conducting state. In this instance, since no gate pulse falls, no voltage drop by capacitive coupling is produced. Consequently, the optimum reference potential VcomH substantially coincides with the center potential Vref of the image signals Vsig. Accordingly, for each sample, the voltage drop by capacitive coupling is given by VcomH−VcomN=ΔVcom. As apparently seen from the graph of FIG. 9, the voltage drop ranges from 0.3 to 0.4 V with all of the samples and the dispersion is very small. Accordingly, it is comparatively easy to set, for individual liquid crystal display devices of the active matrix type, an optimum value for the reference potential Vcom which is compensated for by a substantially fixed voltage drop.

However, the conventional liquid crystal display device of the active matrix type has a problem to be solved in that, since residual of charge actually occurs with liquid crystal picture elements, the optimum value of the reference potential Vcom set once undergoes an apparent variation. This will be described briefly with reference to FIG. 10. If a liquid crystal picture element PXL is driven continuously, then charge is accumulated in an interface between the common electrode COM and an orientation film, another interface between the picture element electrode E and the orientation film and so forth to make a charge residual condition. If ac driving of the liquid crystal picture element is stopped once in such a charge residual condition, then this results in connection of an imaginary dc power source VDC to the liquid crystal picture element PXL. Accordingly, when ac driving of the liquid crystal picture element PXL is started again, an offset of the dc voltage VDC is added to the optimum value of the reference potential Vcom set precedently so that the optimum value of the reference potential Vcom is varied apparently.

This will be described using detailed values with reference to FIG. 11. It is assumed that an image signal Vsig of 6±2 V is supplied to the signal line X. If a voltage drop caused by the capacitive coupling described above is not taken into consideration, then the reference potential Vcom is set to 6 V so that it may coincide with the central potential of the image signal Vsig. It is also assumed that the liquid crystal picture element PXL is driven continuously, and consequently, residual of charge occurs with the liquid crystal picture element PXL so that a dc offset VDC is added to the reference potential Vcom. If the liquid crystal picture element is driven in this condition, then the effective reference potential Vcom changes to 1 V+6 V=7 V. In this condition, complete ac driving cannot be performed. In other words, as a result of the residual of charge, the optimum reference potential Vcom apparently varies from 6 V to 5 V. Since such dc offset amount relies upon the time of continuous driving and also upon the magnitude of the image signal and so forth, a dispersion of the optimum reference potential Vcom occurs even within a single panel.

FIG. 12 illustrates an example of the variation of the optimum value of the reference potential Vcom with respect to time. In order to obtain the measurement data of FIG. 12, ten samples were prepared. Each of the samples was driven by ac which was reversed for each one horizontal period, and the image signal Vsig was set to 6 V fixed. Further, in order to accelerate residual charge, the potential at the common electrode was set to 1.5 V for a half of the samples and to 10.5 V for the remaining half. The optimum value of the reference potential Vcom was measured at an initial stage and after lapse of time of one hour to examine the variation of the same with respect to time. The optimum value of the reference potential Vcom of 5.70 to 5.79 V at the initial stage varied between 5.45 V and 6.03 V after lapse of time of one hour. Although actually such an extreme charge residual condition may not be applicable, residual charge actually occurs with a liquid crystal picture element and the optimum value of the reference potential Vcom varies as a result of continuous driving of the liquid crystal picture element for a long period of time. Further, a dispersion in amount of residual charge occurs even within a single panel.

The conventional liquid crystal display device of the active matrix type thus has a problem to be solved in that, since the optimum value of the reference potential Vcom varies, a seizure of the screen or a residual image occurs, which deteriorates the picture quality remarkably. Further, in addition to seizure, deterioration of the picture quality such as reduction in contrast, flickering and so forth are a problem. Since the variation of the optimum value of the reference potential Vcom with respect to time by residual of charge cannot be compensated for at an initial stage, this is a serious problem to be solved for quality assurance.

SUMMARY OF THE INVENTION

It is an object of the present invention to provide a liquid crystal display device of the active matrix type which effectively prevents residual charge build up in liquid crystal picture elements with respect to time.

In order to attain the object described above, according to an aspect of the present invention, there is provided a liquid crystal display device of the active matrix type, which comprises a liquid crystal panel including a plurality of liquid crystal picture elements formed from a liquid crystal layer held between a plurality of picture element electrodes disposed in a matrix and a plurality of common electrodes opposite to the picture element electrodes, the liquid crystal panel further including a plurality of picture element transistors corresponding to the liquid crystal picture elements, a predetermined reference potential being supplied to the common electrodes while image signals are applied individually to the picture element electrodes by way of a plurality of signal lines and the picture element transistors to effect ac driving of the liquid crystal display elements, and discharge means for connecting the common electrodes and the picture element electrodes to a potential equal to each other.

In the liquid crystal display device of the active matrix type, the predetermined reference potential is supplied to the common electrodes while image signals are applied to the individual picture element electrodes by way of the signal lines and the picture element transistors to effect ac driving of the liquid crystal picture elements. After such ac driving is performed, the common electrodes and the picture element electrodes are connected to a potential equal to each other by way of the discharge means to discharge the charge remaining in the liquid crystal picture elements thereby to prevent the variation of the reference potential. Consequently, once the reference potential is set to an optimum value at the stage when the product is completed, there is no need to readjust the reference potential, Accordingly, there is an effect in that remarkable reduction of the cost required for such adjustment can be achieved. Further, since the optimum value of the reference potential thus set is stable with respect to time, there is another effect in that deterioration of an image such as a seizure, reduction of the contrast and flickering are eliminated.

The liquid crystal panel may further include a plurality of input terminals individually connected to the signal lines and a common terminal connected to the common electrodes, and the discharge means may include discharge elements interposed between the input terminals and the common terminal. Preferably, each of the discharge elements is formed from a switch, and after the switch is turned on, the gate of a corresponding one of the picture element transistors is turned off. Alternatively, each of the discharge elements may be formed from a high resistance element connected between a corresponding one of the input terminals and the common terminal.

Alternatively, the liquid crystal panel may further include a grounding terminal connected to an internal grounding line, a common terminal connected to the common electrodes, and a protective element interposed between the internal grounding line and each of the signal lines while the discharge means includes a high resistance element connected between the grounding terminal and the common terminal, whereby a closed discharge loop is formed from each of the common electrodes, the common terminal, the high resistance element, the grounding terminal, the internal grounding line, the protective element, one of the signal lines, one of the picture element transistors and one of the picture element electrodes in order.

According to another aspect of the present invention, there is provided a method of driving a liquid crystal display device of the active matrix type which includes a plurality of liquid crystal display elements formed from a liquid crystal layer held between a plurality of picture element electrodes arranged in a matrix and a plurality of common electrodes opposite to the picture element electrodes, and a plurality of switching elements for individually switching the liquid crystal picture elements and wherein the liquid crystal picture elements are driven to be reversed by ac with reference to a predetermined reference potential, the method comprising the step of connecting the common electrodes and the picture element electrodes to a potential equal to each other to discharge the charge accumulated in the liquid crystal picture elements thereby to prevent the variation of the reference potential.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
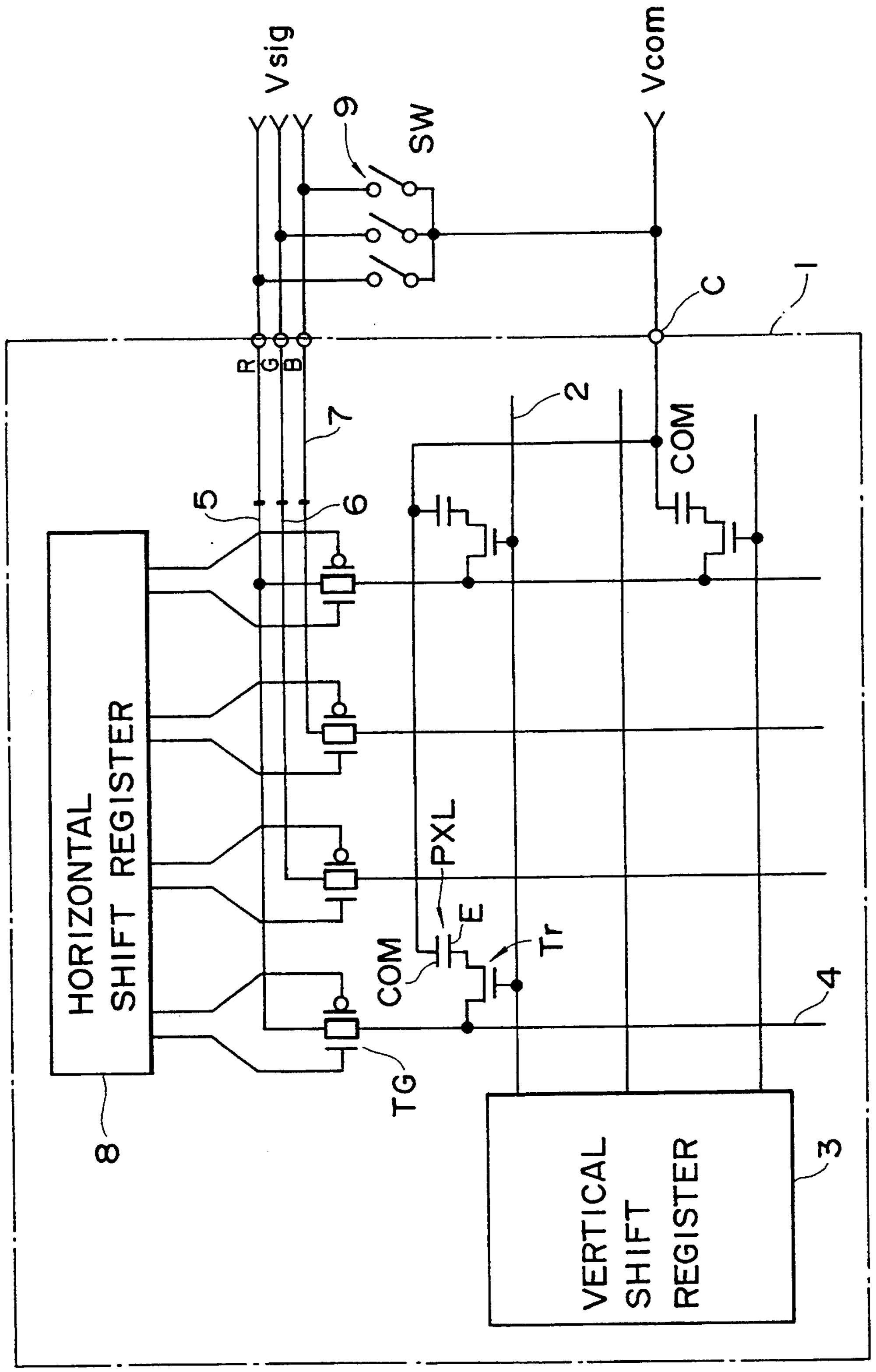
FIG. 1 is a block diagram of a liquid crystal display device of the active matrix type with charge residual prevention capacibility showing a preferred embodiment of the present invention.

Referring first to FIG. 1, there is shown a liquid crystal display device of the active matrix type with a charge residual prevention capability according to the present invention. The active matrix liquid crystal display device shown includes a liquid crystal panel 1. The liquid crystal panel 1 includes liquid crystal picture elements PXL formed from a liquid crystal layer (not shown in FIG. 1) held between picture element electrodes E arranged in a matrix and common electrodes COM opposite to the picture element electrodes E, and picture element transistors Tr corresponding to the liquid crystal display elements PXL. The gate electrodes of the picture element transistors Tr are connected to gate lines 2. The gate lines 2 are connected to a vertical shift register 3 so that gate pulses are successively applied to the gate lines 2. The source electrodes of the picture element transistors Tr are connected to signal lines 4. In the present embodiment, the liquid crystal panel 1 effects color display of the primary colors of R (red), G (green) and B (blue). To this end, the signal lines 4 are connected to common input signal lines 5, 6 and 7 for the primary colors of R, G and B by way of transmission gates TG. The individual transmission gates TG are controlled to be successively rendered conducting by a horizontal shift register 8. The input signal lines 5, 6 and 7 are connected to input terminals R, G and B for the hues assigned to them so that R, G and B image signals Vsig are supplied to them from the outside. Meanwhile, the common electrodes COM are supplied with a reference potential Vcom set to an optimum value in advance from the outside by way of a common terminal C. The image signals Vsig are applied to the individual picture element electrodes E by way of the signal lines 4 and the picture element transistors Tr to effect ac driving of the liquid crystal picture elements PXL. In this instance, the picture element transistors Tr are selected in a line sequential relationship by the vertical shift register 3 while the image signals Vsig supplied from the input terminals R, G and B are distributed to the signal lines 4 by way of the transmission gates TG which are successively rendered conducting by the horizontal shift register 8.

The active matrix liquid crystal display device further includes discharge means 9 for connecting the common electrodes COM and the picture element electrodes E to a potential equal to each other so that, before ac driving is resumed after it is stopped, charge residual in the liquid crystal picture elements PXL is discharged thereby to prevent the variation of the preset reference potential Vcom. In the present embodiment, the discharge means 9 is constituted from discharge elements interposed between the input terminals R, G and B and the common terminal C. The discharge elements here are constituted from switches SW so that, at the point of time when ac driving is stopped, all of the picture element transistors Tr are put into an on-state and then operate in the on-state. Thereafter, the picture element transistors Tr are changed over to an off-state.

A charge residual prevention operation will be described in detail subsequently with reference to FIG. 1. First, at the point in time when ordinary ac operation is completed, the vertical shift register 3 is controlled to put all of the picture element transistors Tr into an on-state by way of the gate lines 2. Simultaneously, the horizontal shift register 4 is controlled to put all of the transmission gates TG into a conducting condition. In this condition, the switches SW constituting the discharge means 9 are turned on. As a result, closed loops including the common terminal C switches SW - input terminals R, G and B - transmission gates TG - signal lines 4 - picture element transistors Tr in order are formed between the common electrodes COM and the picture element electrodes E so that charge accumulated in the individual liquid crystal picture elements PXL is discharged rapidly. In this manner, in the present embodiment, since discharging processing of the liquid crystal picture elements PXL can be performed in a comparatively short time by utilizing the externally provided switches SW, they can be utilized effectively when an image inspection or the like is to be performed in a manufacturing procedure or at the stage of shipment of the product. In particular, it is possible to perform an appropriate image inspection after the factor of a variation of the preset reference potential Vcom such as a seizure, flickering or reduction in contrast caused by residual charge is eliminated. It is to be noted that, while the externally provided switches SW are employed in the present embodiment, the present invention is not necessarily limited to this, and the discharge means 9 may be incorporated integrally in the inside of the liquid crystal panel 1.

Figure 2:
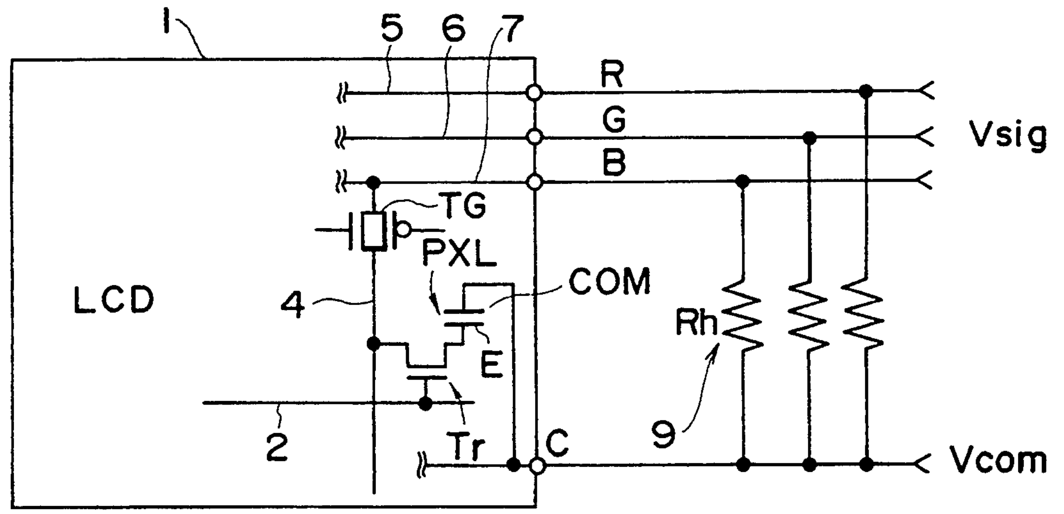
FIG. 2 is a block diagram of another liquid crystal display device of the active matrix type with a charge residual prevention capability showing an alternate preferred embodiment of the present invention.

Referring now to FIG. 2, there is shown another liquid crystal display device of the active matrix type with a residual charge prevention capability according to the present invention. The active matrix liquid crystal display device shown is a modification and has a basic construction similar to that of the active matrix liquid crystal display device shown in FIG. 1. The present active matrix liquid crystal display device is different from the active matrix liquid crystal display device of FIG. 1 only in that the discharge means 9 is constituted from high resistance elements Rh connected between the input terminals R, G and B and the common terminal C. The high resistance elements Rh may be provided externaly or provided in the liquid crystal panel (LCD) 1.

Subsequently, a residual charge prevention according to the present embodiment will be described in detail. Referring to FIG. 2, a common electrode COM and a picture element E which constitute a liquid crystal picture element PXL are connected to a potential equal to each other by way of a closed loop including a high resistance element Rh. In particular, the closed loop shown includes the common terminal C - high resistance element Rh - input terminal B - input signal line 7 transmission gate TG - signal line 4 - picture element transistor Tr in order. After ordinary operation is completed, the transmission gate TG and the picture element transistor Tr are put into a non-conducting condition. In this condition, however, a little leak current flows. Accordingly, after a long interval of time passes, charge accumulated in the liquid crystal picture element PXL is discharged by way of the closed loop. It is to be noted that the high resistance element Rh is set to a comparatively high resistance value (for example, 47 kΩ) compared with its input impedance so that it does not have a negative influence upon ordinary operation. In the present embodiment, since high resistance elements Rh are used in place of switches as the discharge means 9, accumulated charge can be discharged naturally without performing any switching operation or the like. However, a comparatively long time is required for discharge.

Figure 3:
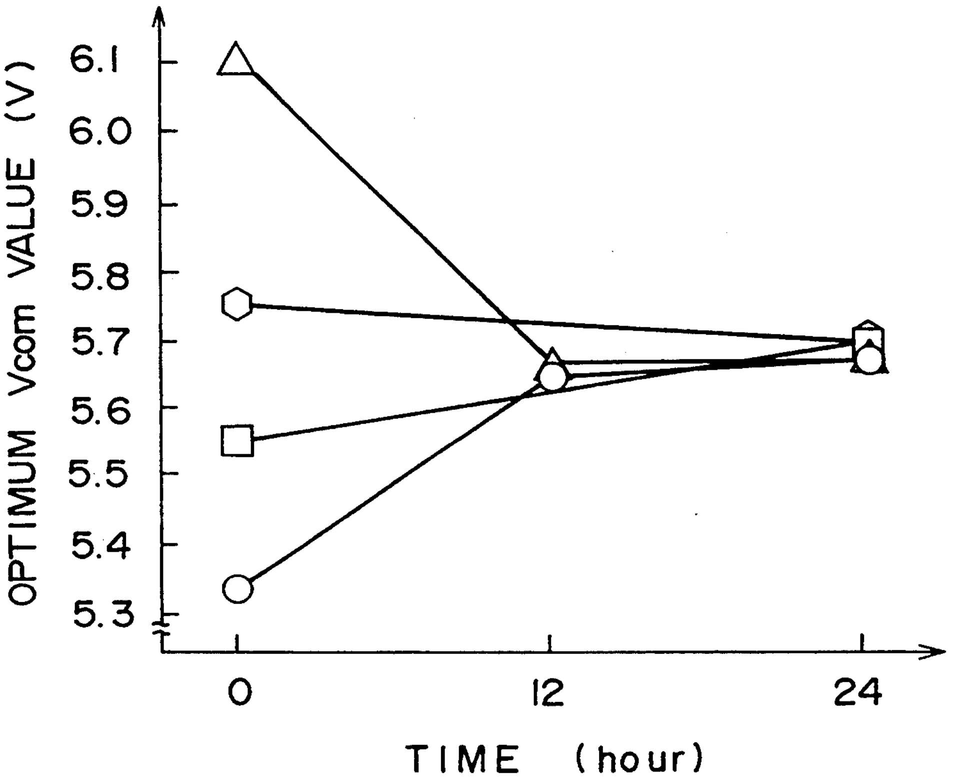
FIG. 3 is a graph showing the variation characteristic of the optimum value of a reference potential for the active matrix liquid crystal display device shown in FIG. 2.

FIG. 3 illustrates a discharge characteristic of the active matrix liquid crystal display device shown in FIG. 2. Since charge is accumulated in the liquid crystal picture elements of individual samples at the point of time when ordinary ac driving is stopped, the optimum value of the reference potential Vcom is dispersed within the range from 5.3 V to 6.1 V. If the optimum value of the reference potential Vcom is measured at a point in time after the liquid crystal display device is left for 12 hours, the optimum values of the reference potential Vcom of all of the samples are already back substantially at 5.70 V. This value is equal to the value of the reference potential Vcom at an initial stage set in advance for all of the samples.

Figure 4:
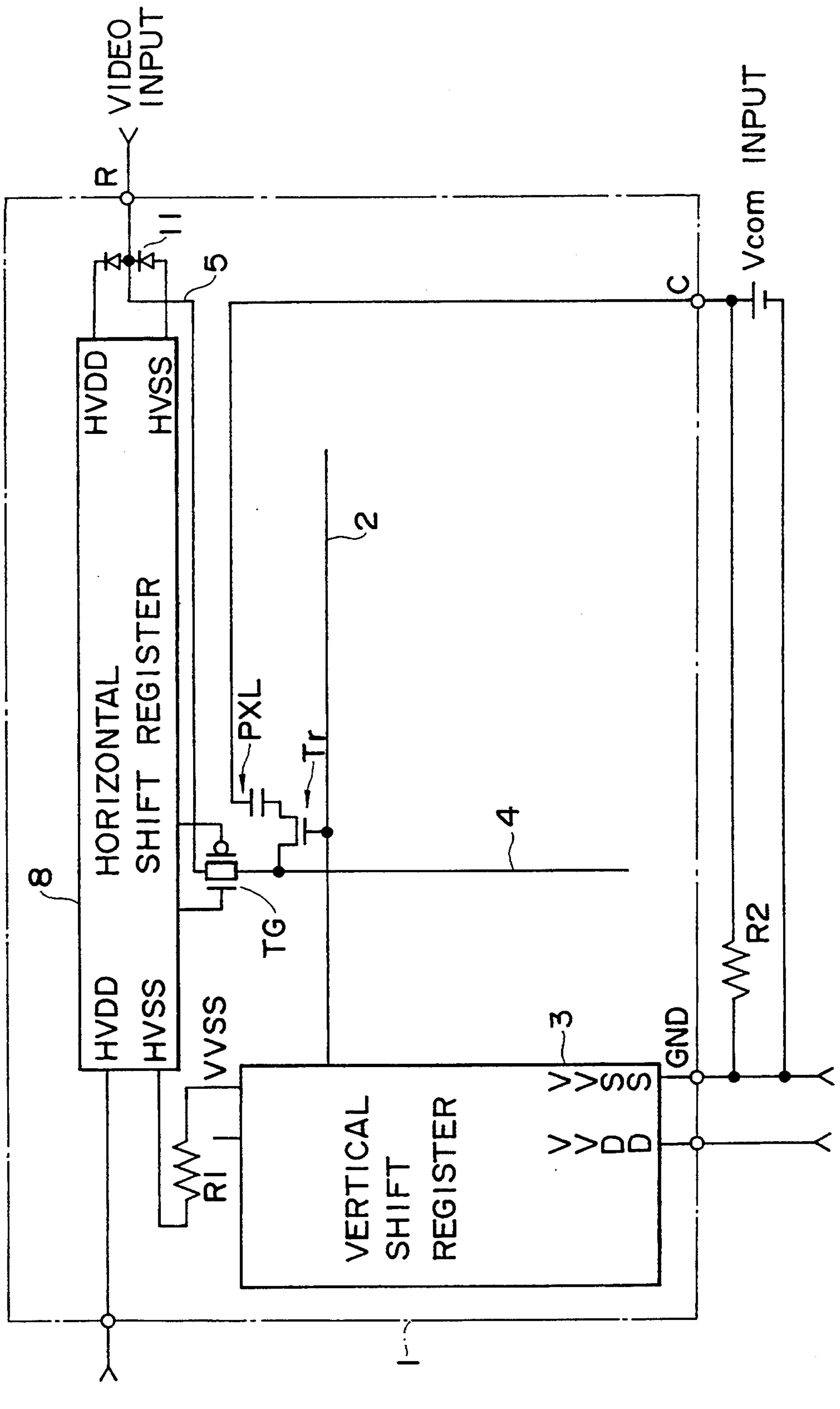
FIG. 4 is a block diagram of a further liquid crystal display device of the active matrix type with charge residual prevention capability showing a further preferred embodiment of the present invention.

Referring now to FIG. 4, there is shown a further liquid crystal display device of the active matrix type with a residual charge prevention function according to the present invention. The present active matrix liquid crystal display device is a modification and has a basically similar construction to the the active matrix liquid crystal display device of FIG. 1. The active matrix liquid crystal display device of the present embodiment is characterized in that a closed discharge loop is constructed by means of a grounding line provided in the liquid crystal panel 1. In particular, the vertical shift register 3 has a power source line VVDD and a grounding line VVSS. A predetermined power source voltage is supplied from the outside to the power source line VVDD by way of a corresponding power source terminal. Meanwhile, the grounding line VVSS is grounded by way of a corresponding grounding terminal GND. Also the horizontal shift register 8 has a power source line HVDD and a grounding line HVSS. A predetermined power source voltage is supplied from the outside to the power source line HVDD by way of a corresponding power source terminal. Meanwhile, the grounding line HVSS is internally connected to the grounding line VVSS of the vertical shift register 3 by way of a predetermined resistance element R1. Meanwhile, an internal input signal line 5 is connected to an input terminal R (only an input terminal R corresponding to a red picture element is shown in FIG. 4 for simplified illustration) of the liquid crystal panel 1 so that a video input is received from the outside. An input protective element 11 is interposed between the input signal line 5 and the grounding line HVSS. The input protective element 11 may be constituted from a protective diode. Further, a predetermined reference potential Vcom is inputted from the outside to the common terminal C. In addition, a resistance element R2 is externally connected between the common terminal C and the grounding terminal GND. The resistance value of the high resistance element R2 may be set, for example, to 200 kΩ.

In the active matrix liquid crystal display device of the present embodiment, the high resistance element R2 constitutes a discharge means, and a predetermined closed discharge loop is formed between the picture element electrode and the common electrode of each liquid crystal picture element PXL. In particular, the closed loop is comprised of the common terminal C - high resistance element R2 - grounding terminal GND - internal grounding line VVSS-resistance element R1 - internal grounding line HVSS protective element 11 - input signal line 5-transmission gate TG - picture element transistor Tr in order.

Figure 5:
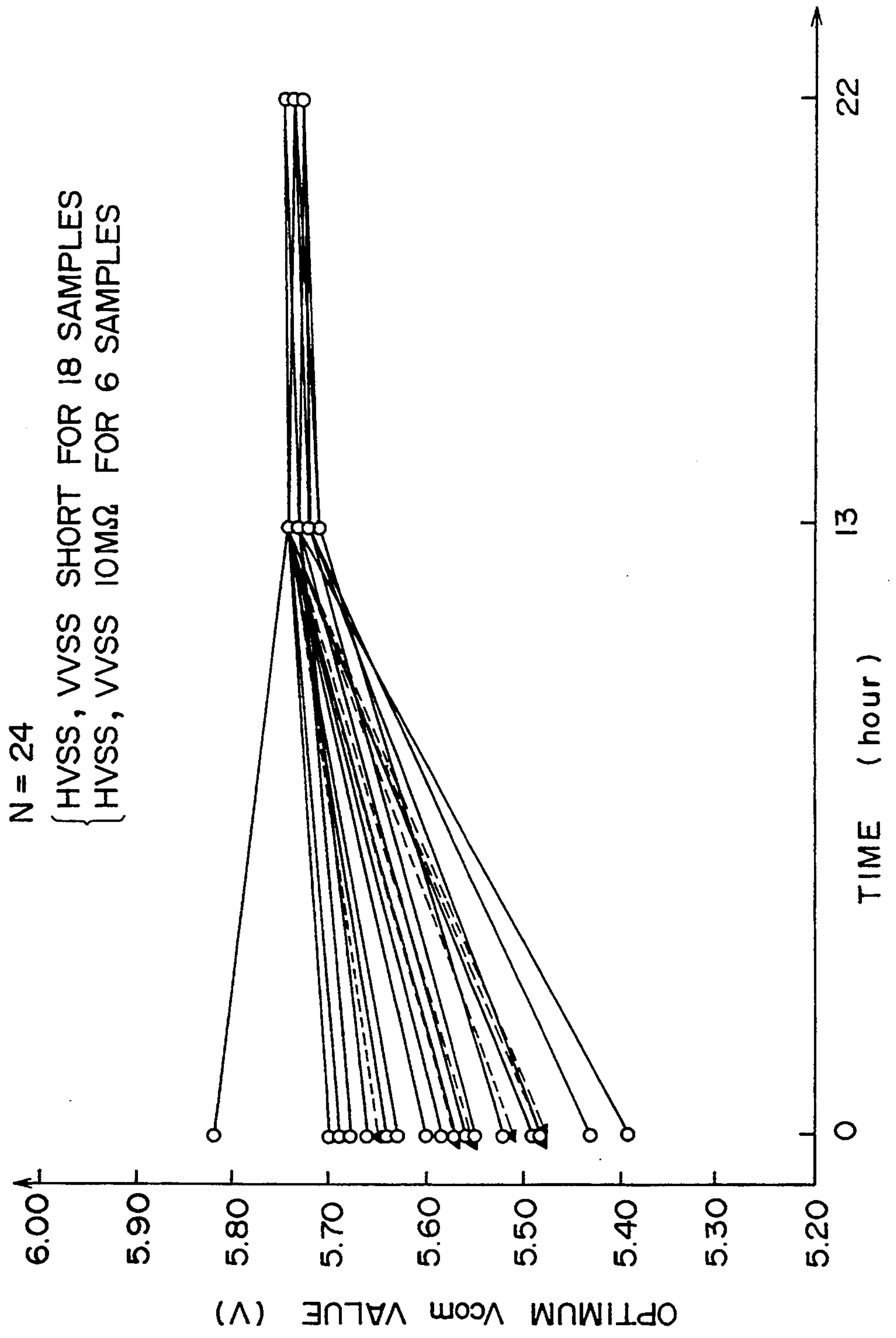
FIG. 5 is a graph showing the variation characteristic of the optimum value of the reference potential in the active matrix liquid crystal display device shown in FIG. 4.
Figure 6:
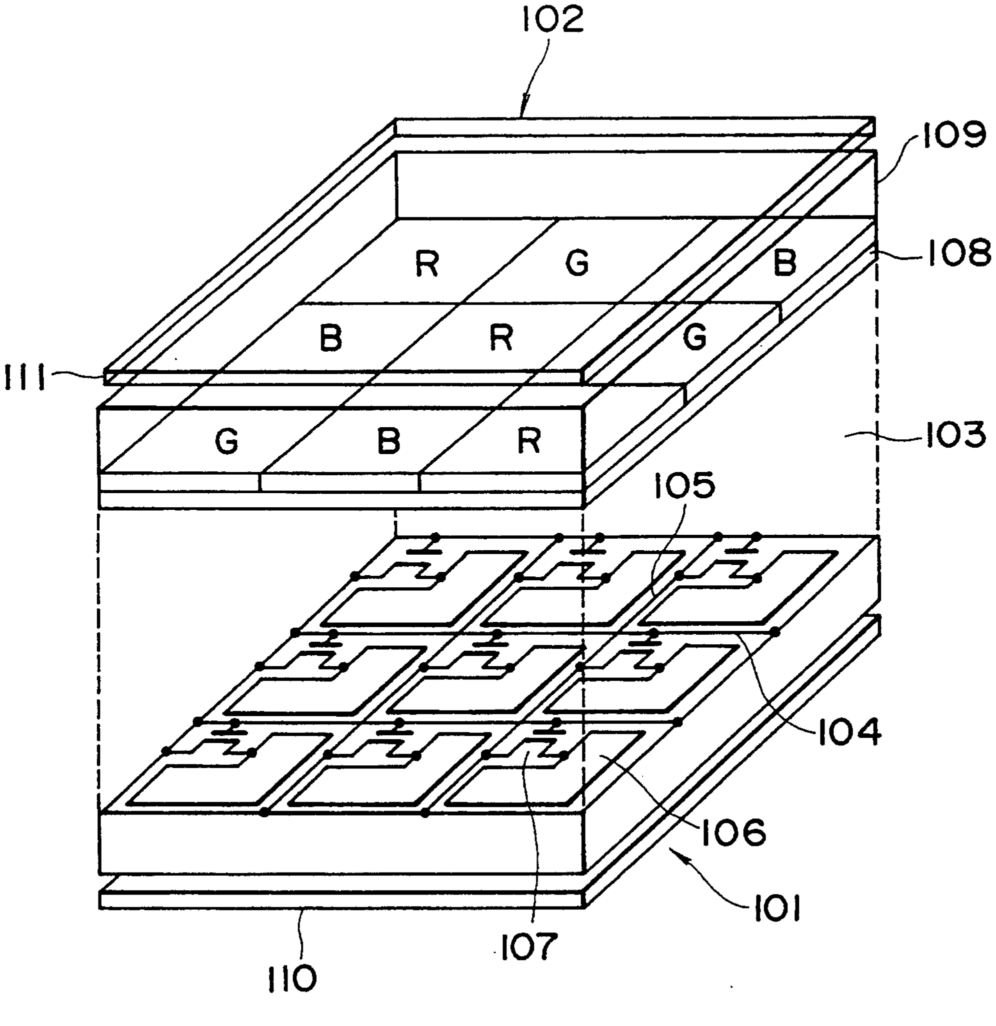
FIG. 6 is a perspective view showing general construction of a conventional liquid crystal panel of the active matrix type.
Figure 7:
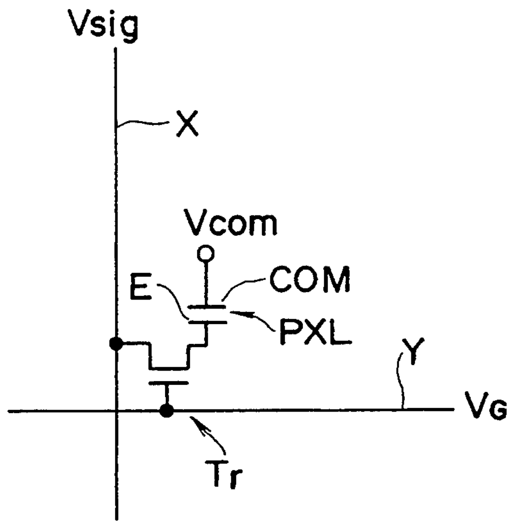
FIG. 7 is a circuit diagram of an equivalent circuit for a liquid crystal picture element of the conventional active matrix liquid crystal display device shown in FIG. 6.
Figure 8:
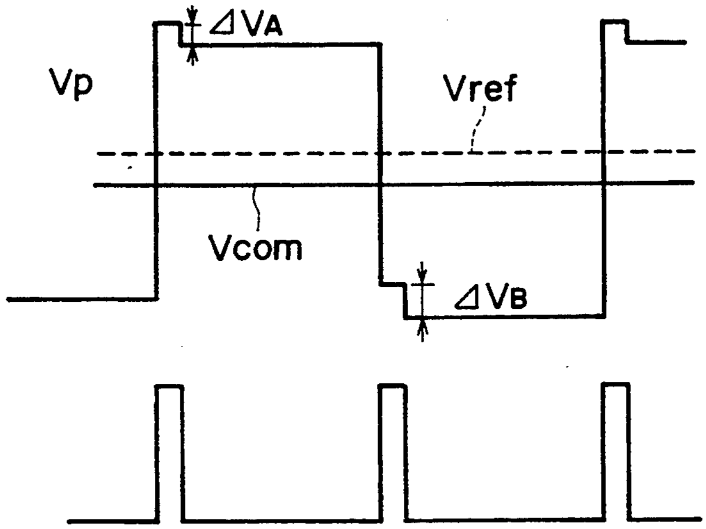
FIG. 8 is a waveform diagram illustrating operation of the liquid crystal picture element shown in FIG. 7.
Figure 9:
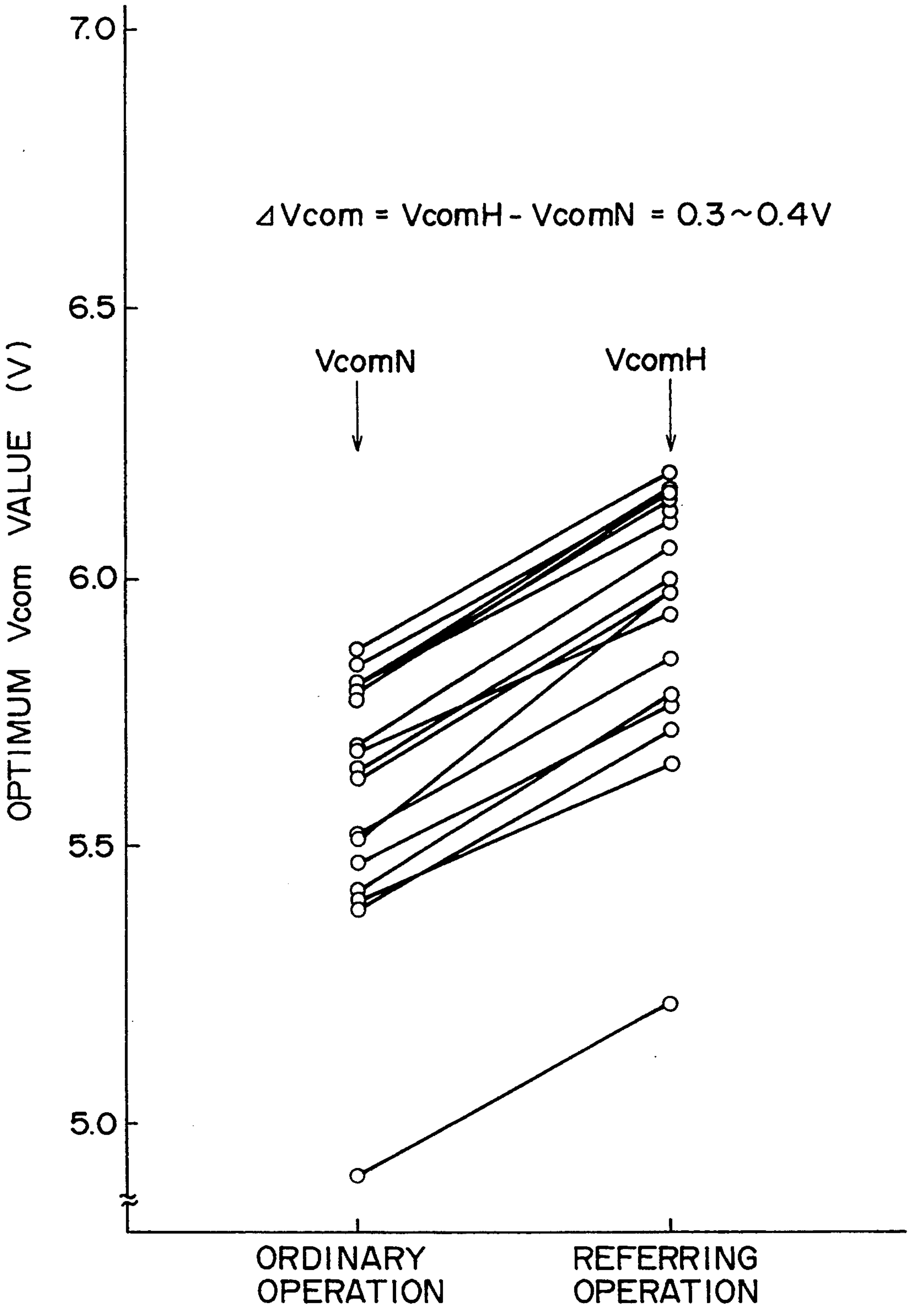
FIG. 9 is a graph illustrating variation of the optimum value of the reference potential for the conventional active matrix liquid crystal display device shown in FIG. 6.
Figure 10:
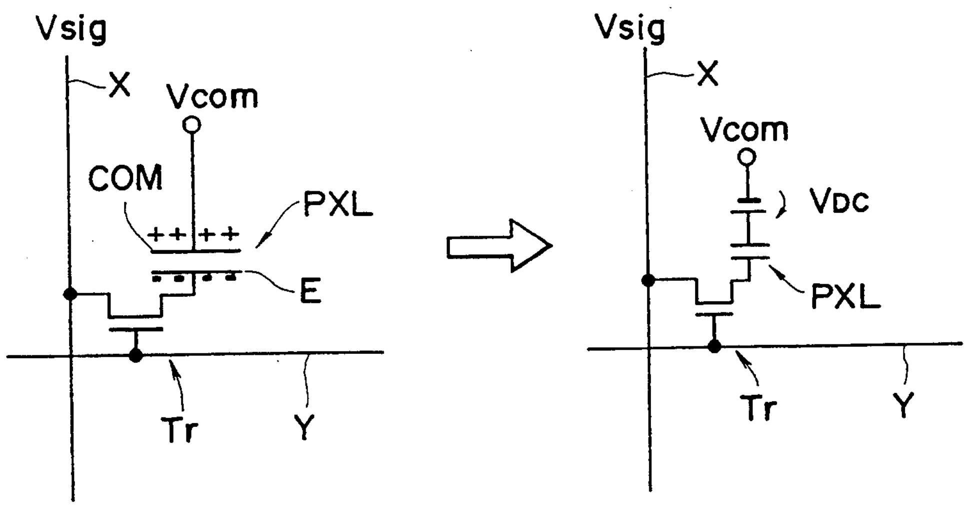
FIG. 10 is schematic diagram illustrating a the problem to be solved for the conventional active matrix liquid crystal display device shown in FIG. 6.
Figure 11:
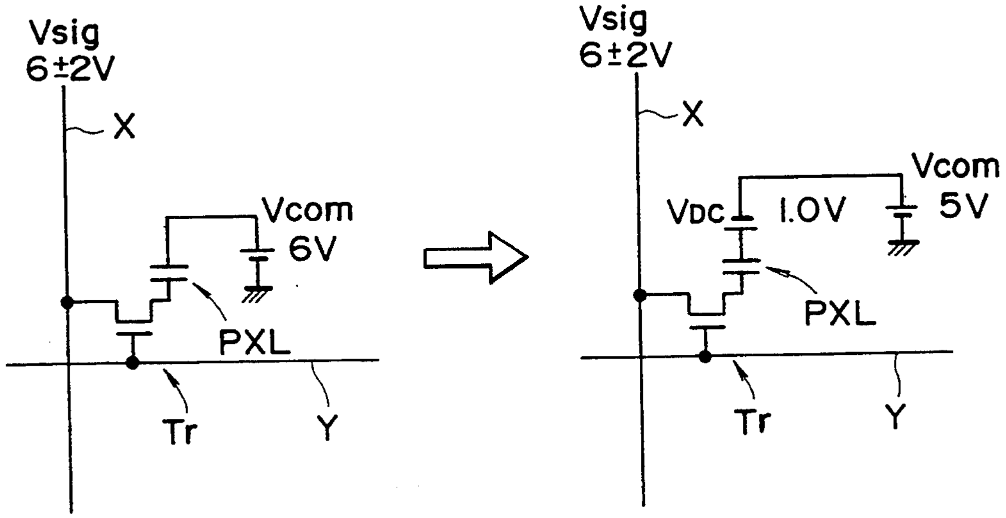
FIG. 11 is a similar view but illustrating another object to be solved for the conventional active matrix liquid crystal display device shown in FIG. 6.
Figure 12:
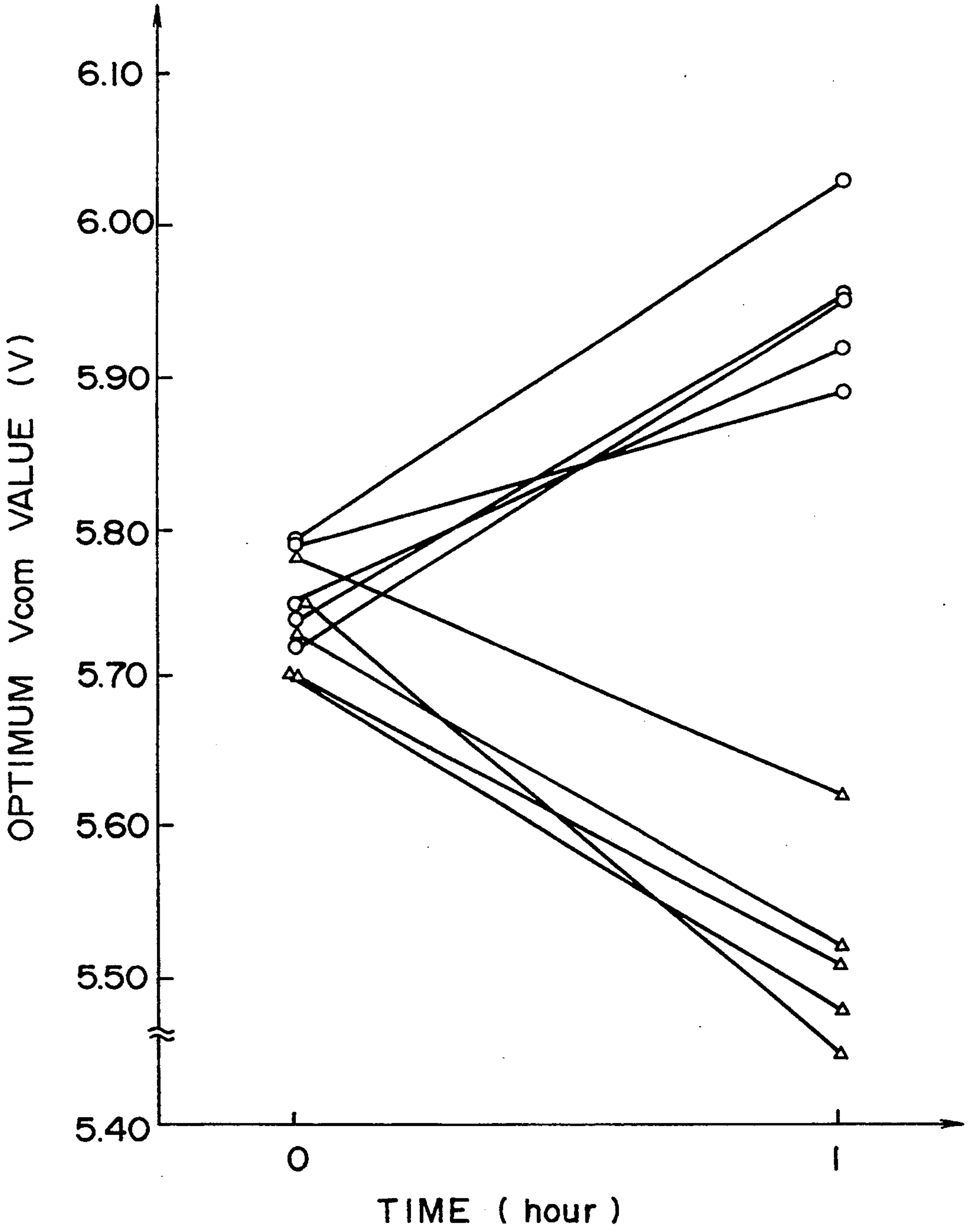
FIG. 12 is a graph illustrating the dispersion of the optimum value of the reference potential for the conventional active matrix liquid crystal display device shown in FIG. 6.

FIG. 5 illustrates a discharge characteristic of the active matrix liquid crystal display device shown in FIG. 4. The axis of ordinate represents the optimum value of the reference potential Vcom and the axis of abscissa represents the elapsed time. Immediately after ordinary ac driving was performed for a plurality of samples, the optimum value of the reference potential Vcom value was measured for the samples, and then, after lapse of a predetermined interval of time, the optimum value of the reference potential Vcom was measured again. More particularly, twenty four samples were prepared, and for eighteen ones of the samples, the grounding line VVSS on the vertical shift register side and the grounding line HVSS on the horizontal shift register side were short-circuited. In other words, the value of the resistance element R1 was reduced to 0. For the remaining six samples, the value of the resistance elements R1 was set to 10 MΩ. As apparently seen from the graph of FIG. 5, at the point in time when ac driving was stopped, the optimum values of the reference potential Vcom were dispersed within the range from about 5.4 V to 5.8 V among the samples due to residual charge of the liquid crystal picture elements. After lapse of 13 hours after ac driving was stopped, the optimum values of the reference potential Vcom converged to or around 5.7 V with substantially all of the samples. It can be seen that, after lapse of 22 hours, the optimum values of the reference potential Vcom were stabilized completely.

Having now fully described the invention, it will be apparent to one of ordinary skill in the art that many changes and modifications can be made thereto without departing from the spirit and scope of the invention as set forth herein.

What is claimed is:

1. An active matrix liquid crystal display device, comprising:

a liquid crystal panel including a plurality of liquid crystal picture elements formed from a liquid crystal layer held between a plurality of picture element electrodes and a plurality of common electrodes opposite said picture element electrodes, said liquid crystal panel further including a plurality of picture element transistors corresponding to said liquid crystal picture elements, a predetermined reference potential being supplied to said common electrodes while image signals are applied individually to said picture element electrodes by way of a plurality of signal lines and said picture element transistors to effect ac driving of said liquid crystal display elements; and discharge means for connecting said common electrodes and said picture element electrodes to a potential equal to each other wherein the liquid crystal panel further includes a plurality of input terminals individually connected to said signal lines and a common terminal connected to said common electrodes, and said discharge means includes discharge elements connected between said input terminals and said common terminal.

2. A liquid crystal display device of the active matrix type according to claim 1, wherein each of said discharge elements is formed from a switch, and after the switch is turned on, the gate of a corresponding one of said picture element transistors is turned off.

3. A liquid crystal display device of the active matrix type according to claim 1, wherein each of said discharge elements is formed from a high resistance element connected between a corresponding one of said input terminals and said common terminal.

4. An active matrix liquid crystal display device, comprising:

a liquid crystal panel including a plurality of liquid crystal picture elements formed from a liquid crystal layer held between a plurality of picture element electrodes and a plurality of common electrodes Opposite said picture element electrodes, said liquid crystal panel further including a plurality of picture element transistors corresponding to said liquid crystal picture elements, a predetermined reference potential being supplied to said common electrodes while image signals are applied individually to said picture element electrodes by way of a plurality of signal lines and said picture element transistors to effect ac driving of said liquid crystal display elements; and discharge means for connecting said common electrodes and said picture element electrodes to a potential equal to each other wherein said liquid crystal panel further includes a ground terminal connected to an internal ground line, a common terminal connected to said common electrodes, and a protective element interposed between said internal ground line and each of said signal lines while said discharge means includes a high resistance element connected between said ground terminal and said common terminal, whereby a closed discharge loop is formed from each of said common electrodes, said common terminal, said high resistance element, said ground terminal, said internal ground line, said protective element, one of said signal lines, one of said picture element transistors and one of said picture element electrodes in order.

5. An active-matrix liquid crystal display device comprising:

a plurality of display elements, each display element comprising opposed electrodes with a liquid crystal material therebetween and associated with a corresponding pixel transistor, said opposed electrodes comprising a pixel electrode and a common electrode;

means for providing a video signal to the pixel electrode through a signal line and corresponding pixel transistor;

means for providing a reference voltage to the common electrode;

means for discharging accumulated charge in the display elements by connecting the common electrode and the pixel electrode to a potential equal to each other wherein an input terminal is connected to the signal lines and a common terminal is connected to the common electrodes and said means for discharging includes a discharge elements connected between said input terminal and said common terminal.

6. An active-matrix liquid crystal display device as claimed in claim 5, wherein said discharge element comprises a switch element.

7. An active-matrix liquid crystal display device as claimed in claim 5, wherein said discharge element comprises a high resistive element.

* * * * *